US006047802A

United States Patent [19]

Huang

[11] Patent Number: 6,047,802

[45] Date of Patent: Apr. 11, 2000

[54] RATCHET DRIVING MECHANISM

[76] Inventor: Chin-Tan Huang, No 39, Lane 240, Li-Jih Rd., Ta-Li City, Taichung Hsien, Taiwan

[21] Appl. No.: 09/201,712

[22] Filed: Dec. 1, 1998

[51] Int. Cl.$^{7}$ .............................. B25B 13/46; F16D 11/06

[52] U.S. Cl. ............................................ 192/43.2; 81/63.1

[58] Field of Search ................................ 74/578; 81/63.1; 192/43.2

[56] References Cited

U.S. PATENT DOCUMENTS 2,395,681 2/1946 Odlum et al. .......................... 192/43.2

3,222,943 12/1965 McDonald ................................ 74/157

4,901,607 2/1990 Beugelsdyk et al. .................... 81/63.2

*Primary Examiner*—Allan D. Herrmann

*Attorney, Agent, or Firm*—Rosenberg, Klein & Lee

[57] ABSTRACT

A ratchet driving mechanism including a main body, an adjusting ring and a coupling member. The main body is formed with a rotary seat with two retractably outward extending detents. The detents can extend into an adjusting groove of the adjusting ring and engage with teeth of toothed inner circumference of a hoop section of the coupling member. By means of the adjusting ring, the operation direction of the detents can be adjusted. The detents have greater strength and applicable to those situations necessitating greater torque.

7 Claims, 6 Drawing Sheets

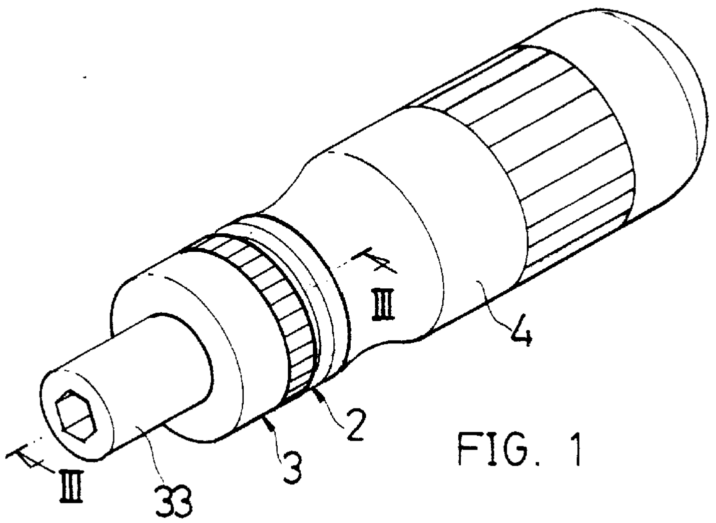
FIG. 1
FIG. 2
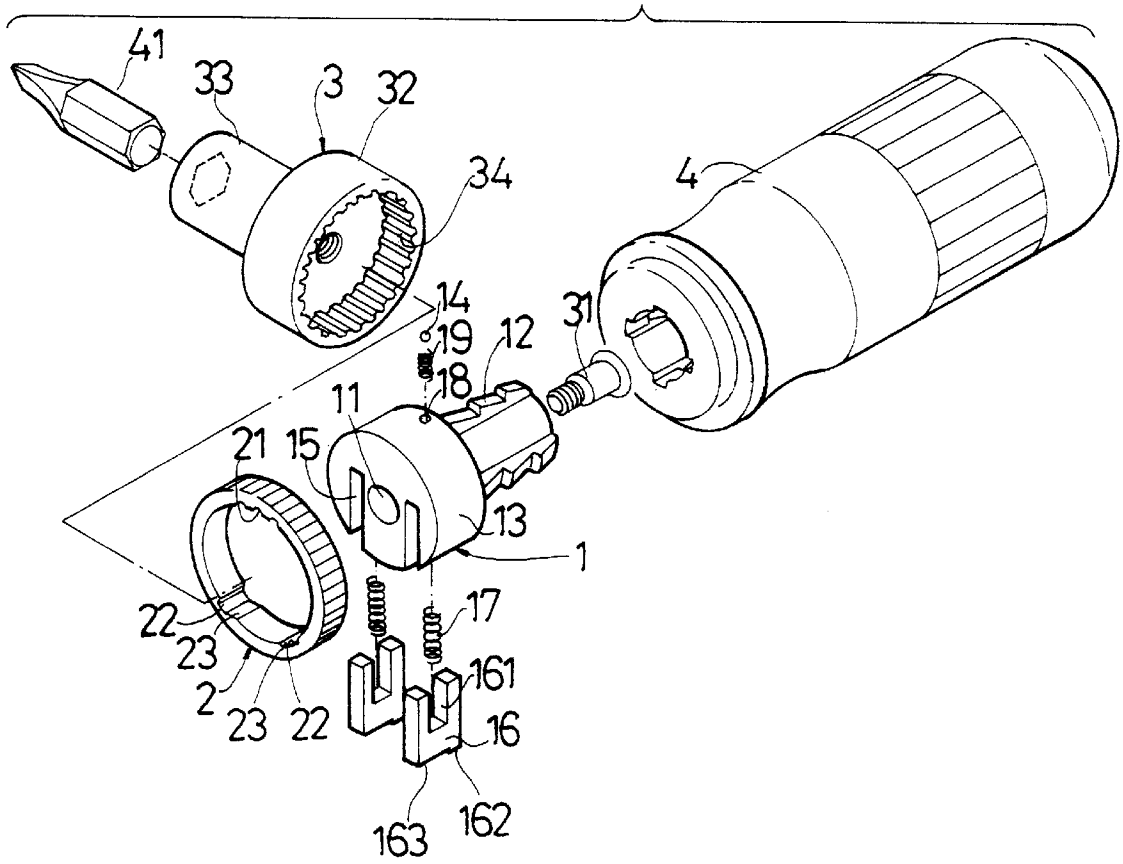

RATCHET DRIVING MECHANISM

BACKGROUND OF THE INVENTION

The present invention relates to a ratchet driving mechanism which is applicable to those situations necessitating greater torque.

FIGS. 11 to 13 show an existing ratchet mechanism used in a screwdriver 8. A bottom end of the grip 81 of the screwdriver 8 is disposed with a connector 82 for replaceably connecting with a screwdriver head 83. The ratchet mechanism 84 of the screwdriver includes an adjusting plate 85 having two internal clicks 851 for respectively engaging with the teeth 821 of the connector 82 in different directions. The clicks 851 are thin plate members so that in the case that the grip 81 is subject to a relatively great force, the clicks 851 tend to bend and slip away or even the screwdriver 8 may be damaged.

SUMMARY OF THE INVENTION

It is therefore a primary object of the present invention to provide a ratchet driving mechanism in which by means of an adjusting ring, the operation direction of two detents can be adjusted. Moreover, the detents are positioned in insertion slots of the main body and have greater strength and thus are applicable to those situations necessitating greater torque.

The present invention can be best understood through the following description and accompanying drawings, wherein:

BRIEF DESCRIPTION OF THE DRAWINGS

FIG. 1 is a perspective assembled view of a first embodiment of the present invention;

FIG. 2 is a perspective assembled view of the first embodiment of the present invention;

DETAILED DESCRIPTION OF THE PREFERRED EMBODIMENTS

Figure 3:
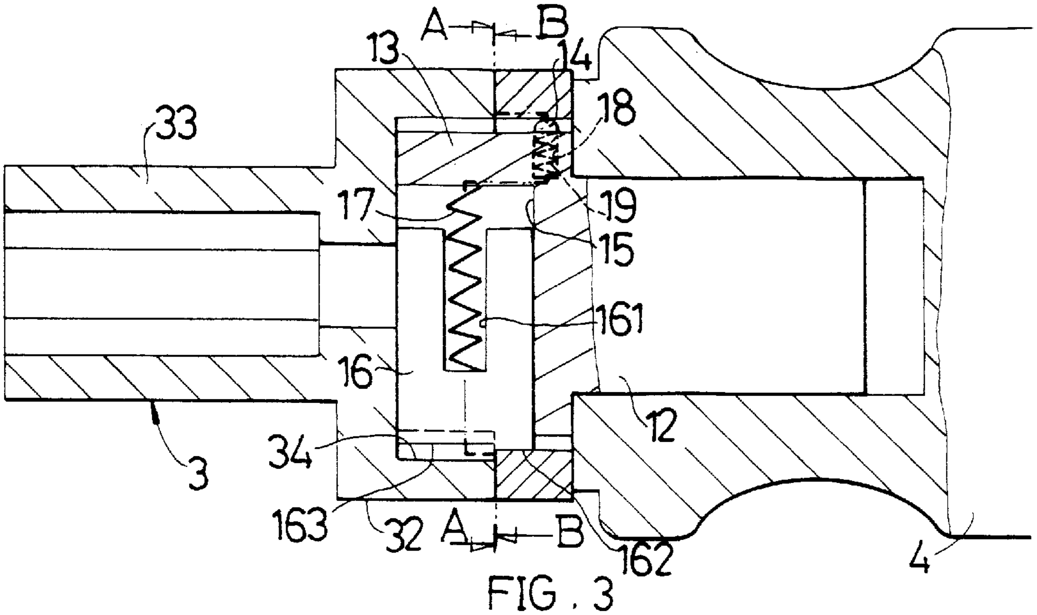
FIG. 3 is a sectional view taken along line III—III of FIG. 1.

Please refer to FIGS. 1 to 7 which show a first embodiment of the present invention. The ratchet driving mechanism of the present invention is installed on a screwdriver grip 4, including:

a main body 1 formed with an axial shaft hole 11, one end of the main body 1 being formed with a connecting section 12 for connecting with the screwdriver grip 4, the other end of the main body 1 being disposed with a cylindrical rotary seat 3, one side of the rotary seat 13 being formed with a socket 18 receiving therein a pushing spring 19 for pushing a steel ball 14 at outer end, the other side of the rotary seat 13 being formed with two insertion slots 15 respectively on two sides of the shaft hole 11, a detent 16 being inserted in each insertion slot 15, an inner end of the detent 16 being formed with a recess 161 in which a spring 17 is disposed for outward pushing the detent 16, an outer end of the detent 16 being formed with a first and a second sections 162, 163, the first section 162 slightly projecting outward relative to the second section 163;

an adjusting ring 2 fitted around the rotary seat 13 of the main body 1, one side of an inner circumference of the adjusting ring 2 being formed with an engaging dent 21 for engaging with the steel ball 14, the inner circumference of the adjusting ring 2 being further formed with two adjusting grooves 22 for the first section 16 of the detent 16 to extend thereinto, the adjacent sides of the adjusting grooves 22 being respectively formed with two guiding slope faces 23; and a coupling member 3 rotatably fitted on the main body 1 via a screw 31 passing through the shaft hole 11, the coupling member 3 having a hoop section 32 fitted on the rotary seat 13 against one end of the adjusting ring 2, the hoop section 32 having a toothed inner circumference formed with multiple teeth 34 for engaging with the second section 163 of the detent 16, the coupling member 3 further having a fitting section 33 for fitting with a screwdriver head 41.

Figure 4:
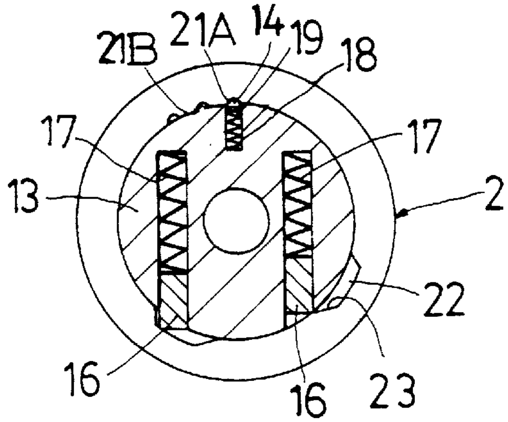
FIG. 4 is a sectional view taken along line A—A of FIG. 3, showing the operation of the present invention in a first state.
Figure 5:
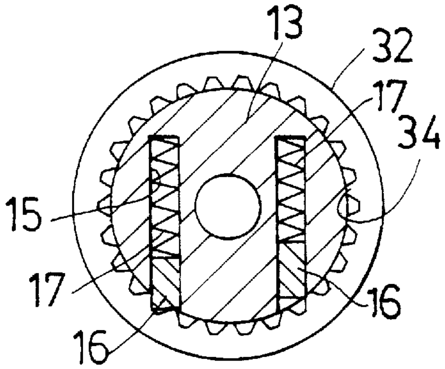
FIG. 5 is a sectional view taken along line B—B of FIG. 3, showing the operation of the present invention in the first state.
Figure 6:
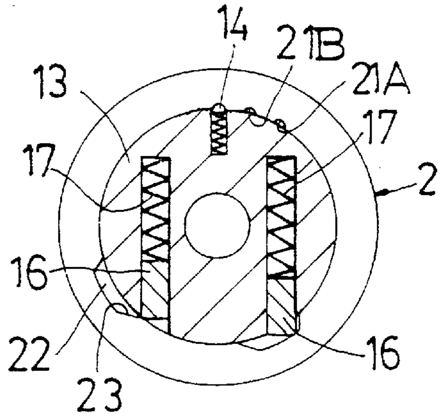
FIG. 6 is a sectional view taken along line A—A of FIG. 3, showing the operation of the present invention in a second state.

Please refer to FIGS. 2 to 7. In use of the present invention, the screwdriver head 41 is first inserted into the fitting section 33 of the coupling member 3. Then the adjusting ring 2 is rotated to adjust the tightening direction. In the case that the clockwise direction is the tightening direction, as shown in FIG. 4, the adjusting ring 2 is counterclockwise rotated, making the steel ball 14 engaged in the right side engaging dent 21A and making the right side detent 16 pushed back by the slope face 23 of the adjusting groove 22 and totally retracted into the insertion slot 15. At this time, the detent 16 will not contact with the teeth 34 of the coupling member 3. As shown in FIG. 5, when a user clockwise rotates the screwdriver grip 4, the teeth 34 of the coupling member 3 abuts against the left side of the left side detent 16 and the action force of the teeth 34 onto the detent 16 has an outward pushing component so that the detent 16 will not be retracted into the insertion slot 15 and will be engaged with the teeth 34. Therefore, the coupling member 3 can be synchronously driven and rotated so as to tighten a screw (not shown). Reversely, when the user counterclockwise rotates the screwdriver grip 4, the outer end face of the left side detent 16 abuts against the teeth 32 of the coupling member 3 and the teeth 32 will exert a component of force for pushing back the detent 16. Therefore, the detent 16 is pushed back into the insertion slot 15 without engaging with the teeth 34 so that the coupling member 3 will not be rotated along with the grip. Accordingly, a one-way ratchet driving effect is achieved.

Figure 7:
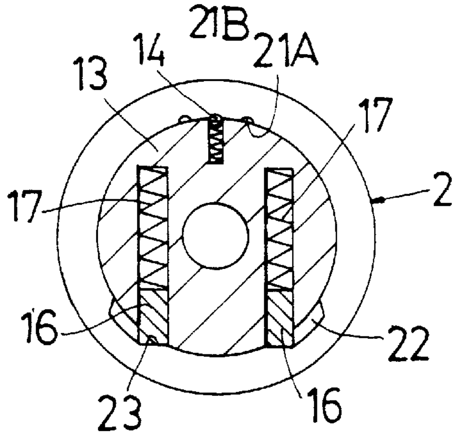
FIG. 7 is a sectional view taken along line A—A of FIG. 3, showing the operation of the present invention in a third state.

In the case that it is desired to synchronously rotate the coupling member 3 and the screwdriver grip 4 in both clockwise and counterclockwise directions, the adjusting ring 2 is turned to make the steel ball 14 engaged in the middle engaging dent 21B and make the two detents 16 respectively extend into the adjusting grooves 22 (as shown in FIG. 7). Accordingly, when clockwise or counterclockwise rotating the grip, the two detents 16 are engaged with the teeth 32 of the coupling member 3 so as to achieve a synchronous rotation.

It should be noted that most of the detents 16 are received in the insertion slots 15 and only small part thereof project outward. Therefore, the detents 16 are subject to very little bending torque and thus the present invention has greater bending strength and is applicable to those situations requiring greater torque. Therefore, the present invention is applicable to hand tools such as a wrench.

Figure 8:
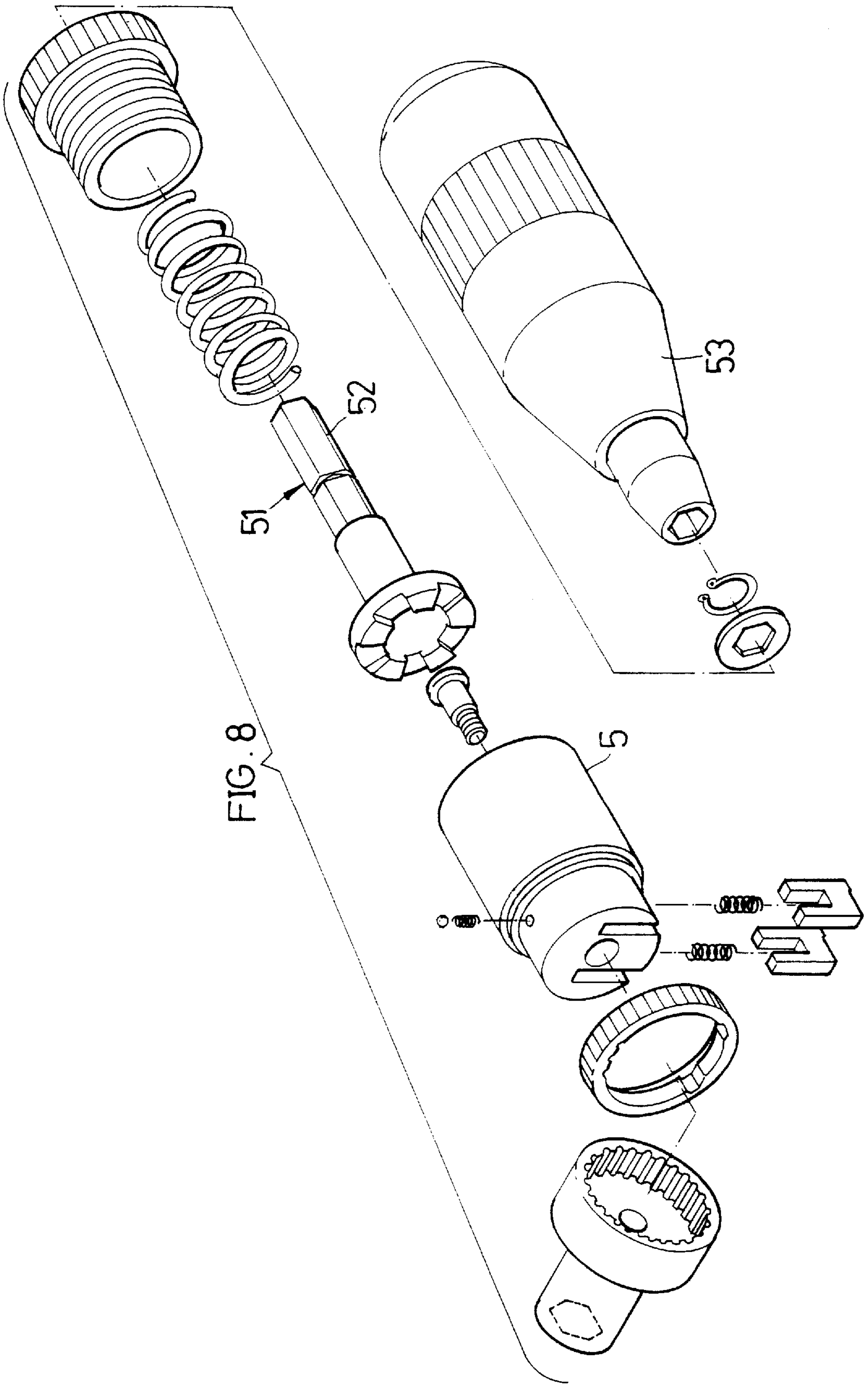
FIG. 8 is a perspective exploded view of a second embodiment of the present invention.

FIG. 8 shows a second embodiment of the present invention, in which a clutch mechanism 51 with torque-controlling function is added to the main body 5. The clutch mechanism 51 has a coupling stem 52 for coupling with the screwdriver grip 53. Accordingly, in use of the screwdriver, the torque can be controlled to avoid damage of the screw or the thread hole.

Figure 9:
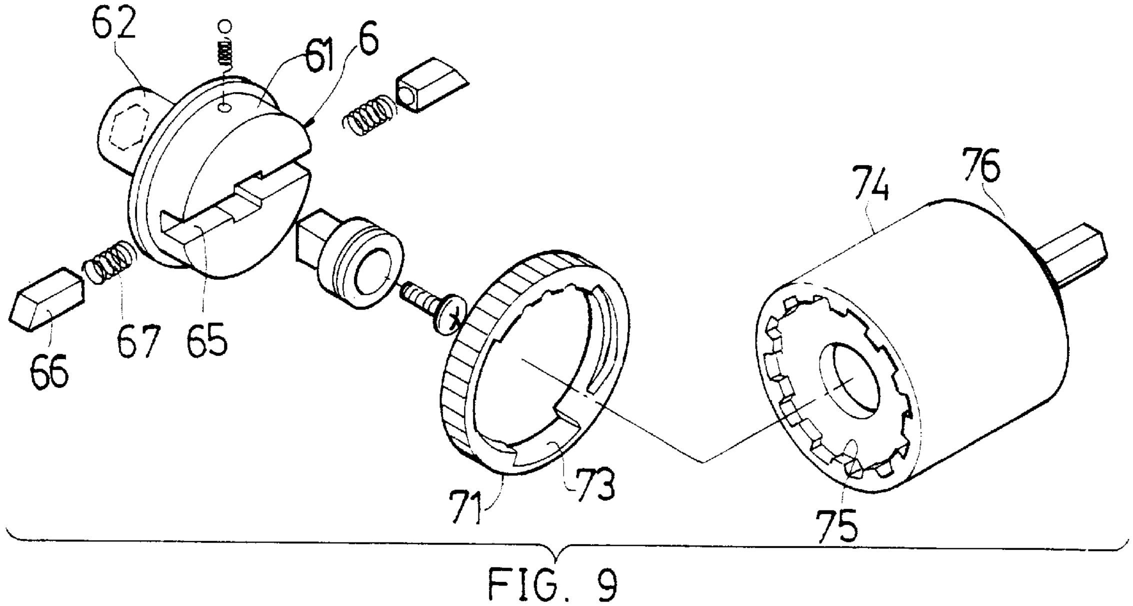
FIG. 9 is a perspective exploded view of a third embodiment of the present invention.
Figure 10:
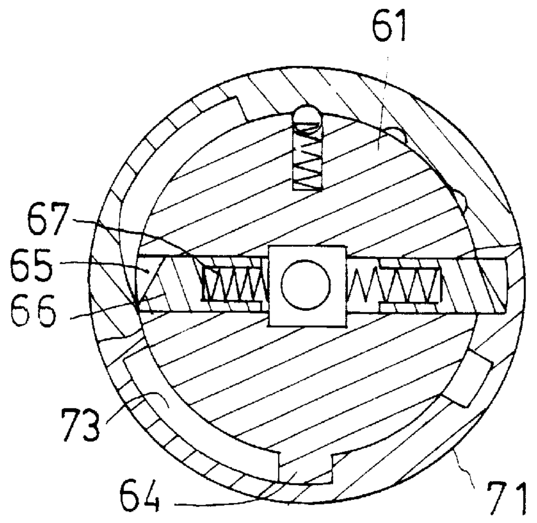
FIG. 10 is a sectional assembled view of the third embodiment of the present invention.
Figure 11:
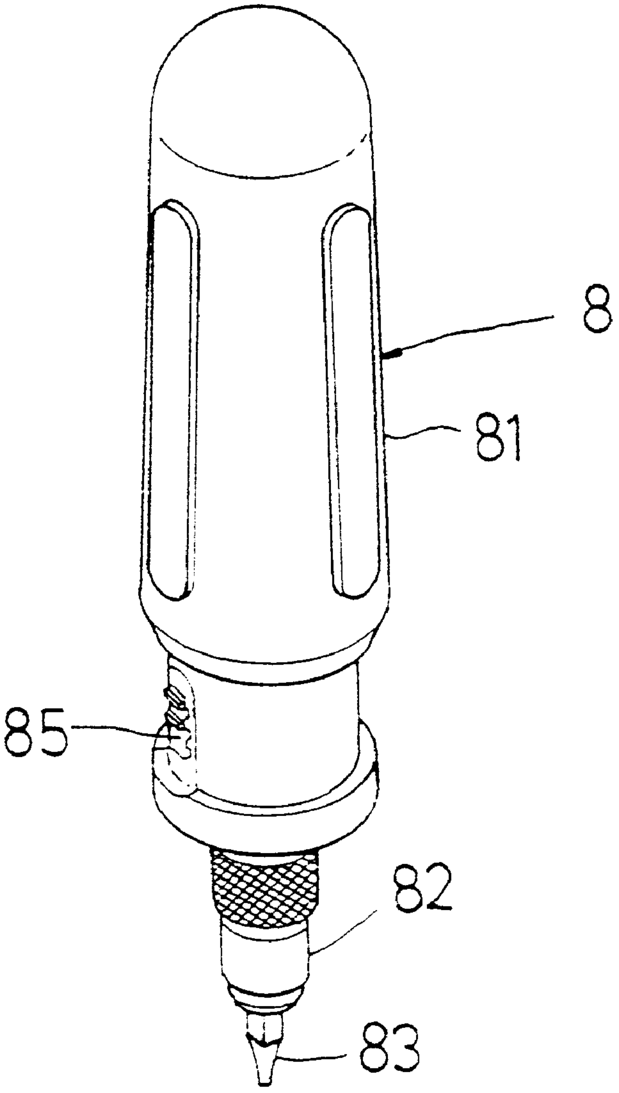
FIG. 11 PRIOR ART
FIG. 11 is a perspective assembled view of a conventional ratchet mechanism of a screwdriver.
Figure 12:
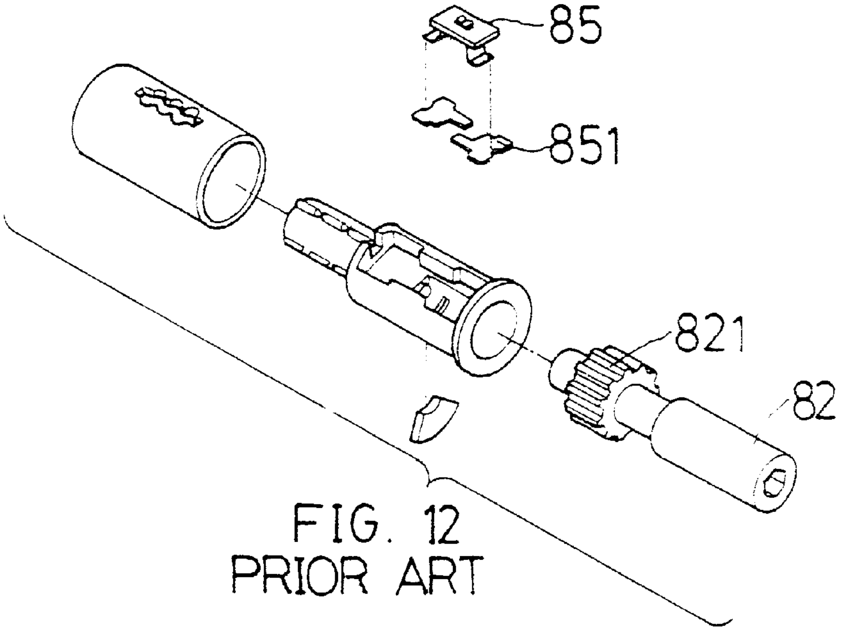
FIG. 12 PRIOR ART
FIG. 12 is a perspective exploded view of the conventional ratchet mechanism.
Figure 13:
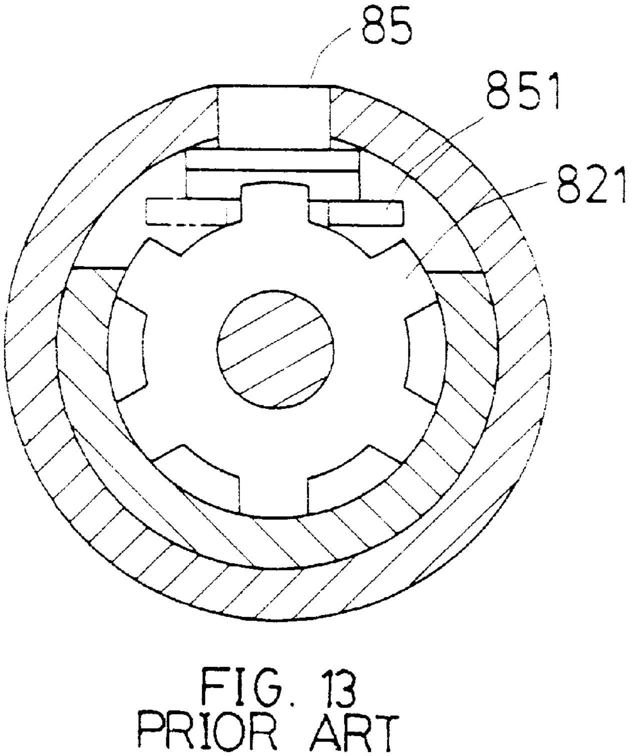
FIG. 13 PRIOR ART
FIG. 13 is a sectional assembled view of the conventional ratchet mechanism.

FIGS. 9 and 10 show a third embodiment of the present invention, in which one side of the main body 6 opposite to the rotary seat 61 is disposed with a fitting section 62. One side of the rotary seat 61 is formed with a projection 64. In addition, two lateral sides of the rotary seat 61 are respectively formed with two insertion slots 65 extending toward the center. A detent 66 and a spring 67 for pushing the detent 66 are positioned in each insertion slot 65. The adjusting ring 71 is disposed with a slide depression 73 for slidably receiving the projection 64. One end of the coupling member 74 is disposed with a hoop section 75 having a toothed inner circumference for one-way engaging with the detent 66. The other end of the coupling member 74 is coupled with a clutch mechanism 76 with torque-controlling function.

It is to be understood that the above description and drawings are only used for illustrating some embodiments of the present invention, not intended to limit the scope thereof. Any variation and derivation from the above description and drawings should be included in the scope of the present invention.

What is claimed is:

1. A ratchet driving mechanism comprising:

a main body, one end of the main body being disposed with a cylindrical rotary seat, one side of a circumference of the rotary seat being disposed with a stopper body, the circumference of the rotary seat being further formed with two insertion slots, a detent being inserted in each insertion slot, an outer end of the detent being formed with a first and a second sections, each detent being outward pushed by a spring disposed in the insertion slot;

an adjusting ring fitted around the rotary seat of the main body, one side of an inner circumference of the adjusting ring being formed with an engaging dent for engaging with the stopper body, the inner circumference of the adjusting ring being further formed with two adjusting grooves for the first section of the detent to extend thereinto, each adjusting grooves having a guiding slope face; and a coupling member rotatably fitted on the rotary seat of the main body, the coupling member having a hoop section fitted on the rotary seat at one end of the adjusting ring, the hoop section having a toothed inner circumference formed with multiple teeth for engaging with the second section of the detent.

2. A ratchet driving mechanism as claimed in claim 1, wherein the main body is formed with an axial shaft hole, a screw being passed through the shaft hole to rotatably connect the main body with the coupling member.

3. A ratchet driving mechanism as claimed in claim 1, wherein an inner end of each detent is formed with a recess for receiving a spring.

4. A ratchet driving mechanism as claimed in claim 1, wherein one end of the coupling member is disposed with a fitting section for fitting with a tool.

5. A ratchet driving mechanism as claimed in claim 1, wherein one end of the main body is formed with a connecting section for connecting a grip.

6. A ratchet driving mechanism as claimed in claim 1, wherein the stopper body is a steel ball pushed by a pushing spring disposed in a socket formed on the rotary seat.

7. A ratchet driving mechanism as claimed in claim 1, wherein the first section of the detent slightly outward projects relative to the second section thereof.

* * * * *